United States Patent [19]

Nenci

[11] 4,389,176
[45] Jun. 21, 1983

[54] MACHINE FOR THE PRODUCTION OF TUBULAR CASINGS OF ALIMENTARY DOUGH

[76] Inventor: Claudio Nenci, Via Carlo Poma 4, Cerese di Virgilio (Mantova), Italy

[21] Appl. No.: 334,048

[22] Filed: Dec. 23, 1981

[30] Foreign Application Priority Data

Mar. 20, 1981 [IT] Italy ............................... 67386 A/81

[51] Int. Cl.³ ............................................. A01J 00/00
[52] U.S. Cl. .................................... 425/101; 425/102; 425/217; 425/297; 425/305.1; 425/308; 425/321
[58] Field of Search ................. 425/90, 101, 102, 296, 425/297, 302.1, 305.1, 308, 319, 320–322, 325, 216, 217

[56] References Cited

U.S. PATENT DOCUMENTS

| | | | |
|---|---|---|---|
| 3,704,664 | 12/1979 | Fisher | 425/321 |
| 4,150,935 | 4/1979 | Venzo | 425/321 |
| 4,171,197 | 10/1979 | Sato | 425/321 |

Primary Examiner—Willard E. Hoag
Attorney, Agent, or Firm—Sughrue, Mion, Zinn, Macpeak and Seas

[57] ABSTRACT

A machine for the production of tubular casings of alimentary dough includes a support structure carrying a continuous belt conveyor with an associated feed conveyor unit for feeding a continuous sheet of dough to the said conveyor. A punching device is provided above the conveyor for successively cutting out a series of spaced-apart pieces of dough from the said sheet, the part of the dough sheet remaining after cutting being taken up from the conveyor by a recovery elevator. Downstream of the recovery elevator, a dispensing unit operates to deposit cylindrical support cores on the conveyor between successive pieces of dough, the dough piece and cores being thereafter transported by the conveyor to a rolling-up unit where the pieces of dough are rolled up around the cylindrical support cores. A collecting conveyor unit receives the support cores, with the pieces of dough rolled therearound, from the rolling-up unit.

18 Claims, 5 Drawing Figures

MACHINE FOR THE PRODUCTION OF TUBULAR CASINGS OF ALIMENTARY DOUGH

The present invention relates to machines for the production of tubular casings of alimentary dough by rolling up pieces of sheet dough around a cylindrical support core. These tubular casings are intended to be filled with a confectionary cream to make the products known by the names "cannoli" or "cannoncini".

In known machines for the production of the said tubular casings a sheet of dough is supplied either in elongate strip form or in substantially oval form, via a horizontal pass of a conveyor belt, to a rolling-up device which rolls up each strip around a tubular support case.

According to the known art, the rolling-up device basically comprises a pin disposed transversely over the conveyor belt and arranged to engage one end of the tubular case. The dough strip is rolled up around the case as the latter is rotated by the pin. When the casings are to be rolled up in a helix, a narrow, elongate dough strip is fed onto the conveyor belt inclined to the direction of advance of the belt itself. As a result, the strip is wound on the cantilevered case covering it up to its free end on which latter a section of strip folds itself so as to form a cylindrical shell closed at one end. The pin is subsequently withdrawn axially to allow the expulsion of the case. This case with its strip of dough wound thereon is then carried to an oven for baking during which the dough stiffens.

Primarily because of the complexity of the movements by means of which the case is threaded onto the pin, rotated thereby, and then withdrawn therefrom, devices of this type possess numerous disadvantages and, in any case, do not permit a high level of production of the casings.

The object of the present invention is to provide a machine in which the feeding of the cylindrical support cores and of the strips or pieces of alimentary dough, the rolling up of these pieces of dough around the support cores, and the removal of the cores themselves once rolling-up has been carried out, will be achieved in an extremely simple and effective manner and thus allow a higher and more regular level of production and a considerable economic saving.

According to the invention, this object is achieved due to the fact that a machine of the type defined at the beginning is characterised in that it comprises in combination:

a support structure, a continuous belt conveyor mounted on the support structure and having a receiving end and a discharge end, feed means for feeding a continuous sheet of dough to the receiving end of the said conveyor, a punching device disposed transversely to and above the conveyor downstream of the feed means and provided with shaped punches arranged to cut the continuous sheet of dough in synchronism with the advance of the conveyor so as to cut out a series of spaced-apart pieces or groups of adjacent pieces of dough successively from the said continuous sheet, recovery means disposed along the conveyor downstream of the punching device for taking up from the conveyor that part of the dough sheet remaining after the cutting of the said pieces, a dispensing unit located above the conveyor downstream of the said recovery means and comprising a receptacle for the cylindrical support cores and a withdrawal member for taking out support cores individually from the receptacle and depositing them on the conveyor so that each of them is disposed transversely between two successive pieces or groups of pieces, a rolling-up unit disposed transversely adjacent the discharge end of the conveyor and including a motorised endless web extending upwardly with respect to the conveyor, the said endless web being supported at its upper end from the support structure for back and forth movement and having a rolling-up pass arranged to advance from its lower end towards its upper end away from the conveyor, and actuator means for effecting, in synchronism with the withdrawal member of the dispensing unit, back and forth movement of the said endless web with respect to the conveyor between a substantially-vertical rolling-up position for entraining in rotation a support core and causing the rolling up thereon of a respective piece or group of pieces of dough, and an inclined discharge position, and collecting means for receiving the support cores and the respective pieces or groups of pieces of dough rolled up therearound from the discharge end of the conveyor when the endless web of the rolling-up unit is moved into its discharge position.

According to a preferred embodiment of the invention, the endless web of the rolling-up unit is constituted by a metal mesh.

The invention will now be described in detail with reference to a preferred practical embodiment illustrated in the appended drawings, provided purely by way of non-limiting example, in which.

Figure 1:
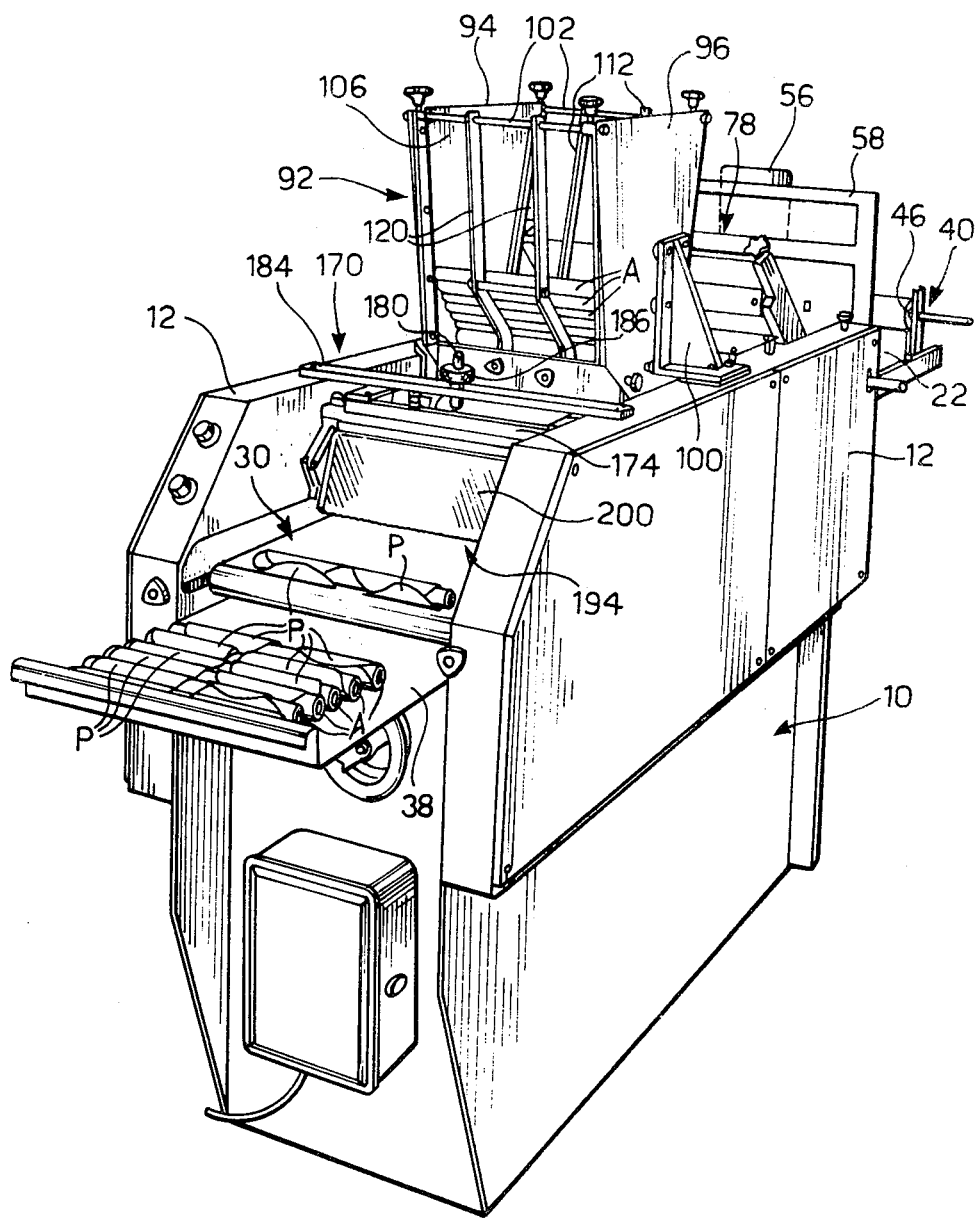
FIG. 1 is a front perspective view of a machine according to the invention.

With reference to FIG. 1, by 10 is indicated the casing of the machine containing the drive members. The upper part of the casing 10 has two vertical side walls 12 between which is located a horizontal conveyor 14 including a continuous belt 16 which passes around a pair of end rollers, respectively a front roller 18 and a rear roller 20. The working pass of the belt 16 is arranged to move in the direction indicated by the arrow F in FIG. 2. As can be seen in this Figure, associated with the rear end of the conveyor 14 is a feed conveyor 22 including a continuous belt 24 which passes around a pair of end rollers, respectively a front roller 26 and a rear roller 28, and is aligned with the belt 16 of the conveyor 14. The feed conveyor 22 has a length which is less than that of the conveyor 14 and its upper, working pass is also arranged to move in the direction of the arrow F.

At the front end of the conveyor 14 is disposed a horizontal collecting conveyor 30 including a continuous belt 32 which passes around a pair of end rollers, respectively a front roller 34 and a rear roller 36. The rear roller 36 is supported by the vertical side walls 12 of the casing 10 in a position below the front roller 18 of the conveyor 14. The conveyor 30 has a length less than that of the conveyor 14. The upper working pass of the collecting conveyor 30 is also arranged to move in the direction of the arrow F and feeds a receiving platform 38 which is situated at a lower level than that of the conveyor 30 and projects from the front end of the vertical side wall 12.

Figure 5:
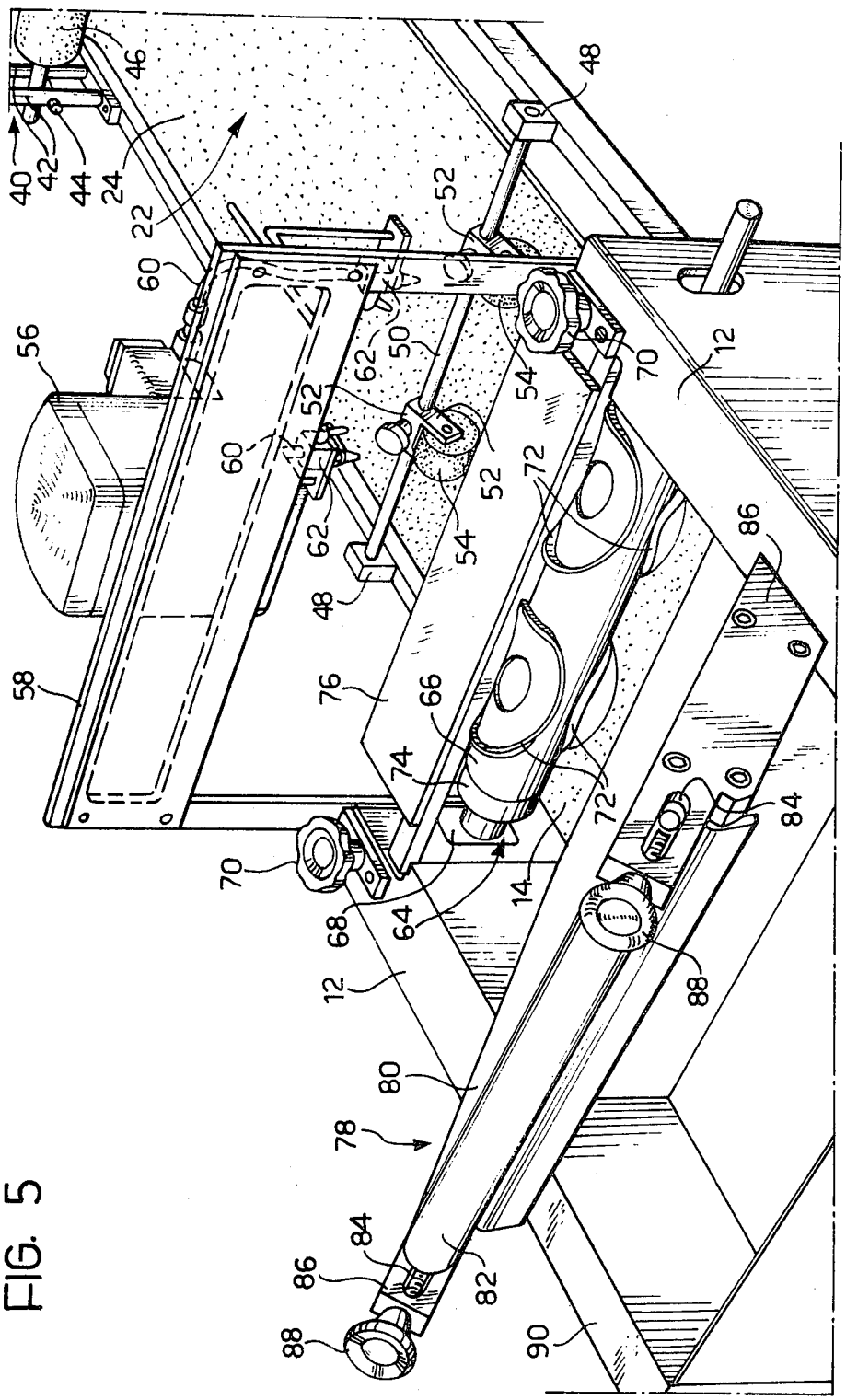
FIG. 5 is a perspective view on an enlarged scale of a further detail of the machine.

As is illustrated in detail in FIGS. 1 and 5, the casing 10 carries, at the sides of the initial section of the feed conveyor 22, two supports in the form of facing forks 40 each of which comprises two vertical rods 42 interconnected by a releasable cross bar 44. The ends of a feed roller 46 are freely rotatably engaged in the two supports 40, the roller thus being disposed transversely of the feed conveyor 22. As will be further specified in the course of the description below, the feed roller 46 is arranged in use to support a sheet of alimentary dough in the form of a roll wound thereon.

Downstream of the forked supports 40 with respect to the direction of conveyance of the feed conveyor 22, two vertical support blocks 48 are also fixed to the casing 10, these blocks being disposed on opposite sides of the conveyor 22 and carrying a transverse support rod 50 on which are engaged two small forked blocks 52. Each forked block 52 freely rotatably supports a roller of spongy material 54 which bears on the working pass of the belt 24 of the feed conveyor 22. Above the rollers 54 is disposed a water tank 56 fixed to a vertical, U-shaped support frame 58 carried transverse the feed conveyor 22 by the casing 10 of the machine. The bottom of the tank 56 is connected, by means of two flexible tubes 60, to a pair of taps 62 carried by the frame 58 and arranged to feed the water in the tank 56 drop by drop to the two rollers 54. The rollers 54 and the tank 56 constitute a moistening unit having the function of moistening the alimentary dough before it is passed by the feed conveyor 22 to the rear end of the conveyor 14.

A punching device, indicated by 64, consists of a rotary drum 66 disposed transverse and above the rear end of the conveyor 14 and rotatably supported at its two ends by the vertical side walls 12 of the casing 10. In fact, the ends of the drum 66 engage in blocks 68 mounted for vertical sliding movement within the side walls 12 whereby to enable the vertical position of the drum 66 to be varied with respect to the conveyor 12. The vertical sliding of the blocks 68 is controlled manually by means of a pair of hand wheels 70 and a transmission not illustrated, constituted for example, by a lead screw and nut system.

The drum 66 is provided on its outer surface with a series of shaped hollow punches 72 the function of which is to cut the continuous sheet of dough coming from the feed conveyor 22 so as to cut out a series of spaced-apart pieces of dough successively from this sheet. In the example illustrated, the drum 66 is provided with two pairs of diametrically opposed punches 72 having a substantially oval or elliptical periphery. However, the number and shape of these punches 72 may be different from that illustrated. Moreover, the machine could be provided with a series of punching rolls 66 of different shapes which are interchangeable with each other. To this end, as illustrated in detail in FIG. 2, the central part of the roll 66 is connected by means of a coupling with a quick-release fitting, to two end spigots 74 which in their turn are fixed to the slidable blocks 68.

By 76 is indicated a substantially L-shaped transverse cover of plastics material fixed to the two vertical side walls 12 in a position intermediate the punching drum 66 and the frame 58 for the tank 56.

Reference 78 indicates a recovery device supported by the vertical side walls 12 immediately downstream of the punching device 64 with respect to the direction of conveyance of the conveyor 14. The recovery device 78 is constituted by an elevator having an endless conveyor belt 80 extending upwardly from a short distance above the working pass of the conveyor 14. The belt 80 is inclined towards the front end of the conveyor 14 and passes around a pair of rollers, respectively a lower roller 81 and an upper roller 82. The tension in the endless belt 80 may be regulated by varying the position of the front roller 82 the ends of which are slidable within respective slots 84 formed in two side walls 86 and are displaceable by means of a pair of manually-controlled hand wheels 88 through a transmission not illustrated, for example of the lead screw and nut type.

The upper end of the elevator 78 feeds a recovery container 90 which is fixed to the side walls 86 and extends horizontally over the conveyor 14.

An idling pressure-roll, not illustrated in the drawing, having its axis transverse to the direction of advance of the elevator 78 may be associated with the working pass of the elevator 78.

By 92 is indicated in its entirety a dispensing unit arranged above the conveyor 14 downstream of the recovery elevator 78. The dispensing unit 92 basically comprises a storage receptacle 94 and a rotary withdrawal drum 96.

The receptacle 94 includes two rigid side walls 98 fixed to the vertical side walls 12 of the machine by means of respective brackets 100 and interconnected with each other by means of two upper transverse rods 102 and two lower transverse rods 104. These upper rods 102 and lower rods 104 constitute slide guides for two internal walls 106 which face each other and lie parallel to the outer walls 98. Each of the walls 106 is fixed to a support frame 108 which is slidable along the guides 102 and 104 for the purpose of varying the width of the internal cavity of the receptacle 94. Each support frame 108 is provided with a stop hand wheel 110 which allows the respective internal wall 106 to be locked to the guides 102 and 104 in the desired position.

The rod 102 nearest the rear end of the conveyor 14 and the two lower rods 104 support two shaped bars 112 bent substantially into an S-shape and forming the rear wall and part of the bottom wall of the receptacle 94. These shaped bars 112 each have an upper vertical portion 112a, an intermediate portion 112b bent downwardly and towards the bottom of the receptacle 94, and a lower vertical portion 112c. A prismatic block 116 is articulated to the intermediate zone of the central portions 112b about a transverse pin 114. Fixed to the block 116 is the upper end of a sheet metal wall 118 which is disposed between the portions 112b and has its lower end 118a bent downwardly to terminate in correspondence with the initial sections of the lower portions 112c of the two bars 112.

Two shaped bars 120 are articulated to the upper rod 102 nearest the front end of the conveyor 14. The bars 120 face bars 112 and have a shape substantially similar to that of the bars 112. Each bar 120 has, in fact, an upper vertical section 120a a central section 120b bent downwardly and towards the interior of the receptacle 94, and a lower substantially-vertical section 120c. The central sections 120b have a length less than the sections 112b of the bars 112 while the lower sections 120c have a length slightly greater than that of the corresponding sections 112c of the bars 112 from which they are spaced. A transverse rod 122 passes through these lower sections 120c, the ends of the rod 122 being inserted in corresponding slots 124 formed in the lower parts of the outer walls 98 and the inner walls 106. At one end of the rod 122 is a stop wheel 126 which is manually operable to lock this rod 122 by friction to the side walls of the receptacle 94 in the desired position. It is thus possible to regulate the angular position of the two bars 120 about the upper rod 102 so as to vary the distance between the lower portions 120c of the bars 120 and the lower portions 112c of the bars 112 and thereby modify the width of the space between these portions which space constitutes a discharge aperture 128 of the receptacle 94. As will be further specified in the course of the description below, the cylindrical support cores which are held in the receptacle 94 and serve for the rolling up of the pieces of alimentary dough, pass through this discharge aperture 128.

The lower ends of the upper vertical portions 112a of the two bars 120 support a transverse pin 130 for pivotally mounting a parallelepiped block 132, similar to the block 116, to which is rigidly fixed one end of a sheet metal wall 134. The wall 134 has an upper section 134a projecting inwardly of the receptacle 94 above the discharge aperture 128, and a lower section 134b bent downwardly and towards the outside of the receptacle 94 substantially parallel to the sheet metal wall 118. Thus the lower section 134b of the wall 134 and the wall 118 define a narrow channel 136 inclined downwardly and opening into the discharge aperture 128.

By 138 is indicated a vertical shield of plastics material fixed to the rod 122 and extending transversely of the conveyor 14 in correspondence with the lower part of the receptacle 94.

The rotary dispensing drum 96 extends transversely of the conveyor 14 in the zone between the discharge aperture 128 and the working pass of the belt 16. The drum 96 is formed by a cylinder having an axial groove 140 of width corresponding to the diameter of the tubular cores contained, in use, in the receptacle 94, the ends of the drum being releasably supported by the vertical sides 12. Two eccentric cams 142 are keyed onto these ends of the drum 96, each cam being surrounded by an annular support 144 of circular profile from the outer periphery of which extends two radial projections, respectively a rear projection 146 and front projection 148. The rear projections 146 of the two supports 144 are connected together by means of a rod 150 which passes through corresponding vertical slots 152 formed in the outer side walls 98 and inner walls 106 of the receptacle 94, while the front projections 148 are connected together by means of a rod 154 located outside the receptacle 94.

A vertical support 156 is fixed to the central part of the rod 150 and carries at its upper end a transverse pin 158 for rotatably supporting a roller 160 against which the sheet metal wall 118 bears. Similarly, a vertical support 162 is fixed to the central part of the rod 154 and carries a transverse pin 164 for rotatably supporting a roller 166 against which the upper section 134a of the sheet metal wall 134 bears. The cams 142, the annular support 144 and the rollers 160 and 166 constitute an agitator device arranged to alternately displace the wall 118 and the wall 134 about their respective articulation pins 114 and 130 to ensure correct feeding of the cylindrical support cores contained in the receptacle 94 towards the discharge aperture 128.

By 170 is indicated in its entirety a rolling-up unit supported by the vertical side walls 12 of the casing 10 of the machine in a position above the front end of the conveyor 14.

The rolling-up unit 170 includes two side plates 172 adjacent the vertical side walls 12 and connected together by means of two transverse rods 174 and 176. An L-shaped bracket 178 is fixed to the rod 174 and its horizontal arm 178a carries a vertical screw 180 which passes, with clearance, through a hole 182 formed in the central part of a crosspiece 184 rigidly fixed at its end to the vertical side walls 12. A regulating nut 186 engages the end of the screw 180 making it possible to regulate the height of the rolling-up unit 170 with respect to the conveyor 14. The vertical arm 178b of the L-shaped bracket 178 carries a rotatable control member 188 having a screw threaded spigot 190 which is screwed into a corresponding screw-threaded hole in the crosspiece 176. The rotation of the control member 188 results in the adjustment of the position of the rolling-up unit 170 in the horizontal sense.

The upper end of a support structure 192 of an endless-web rolling-up device 194 is articulated to the two side plates 172. The rolling-up device 194 includes a driven upper roller 196 and a lower return roller 198 around which passes an endless web in the form of a fine metal mesh 200 the direction of advance of which is indicated by the arrow G. The web rolling-up device 194 extends upwardly with respect to the conveyor 14 and can be swung back and forth with respect to the side plates 172 between a rolling up position illustrated in broken lines in FIG. 3 in which it is substantially vertical and adjacent the front end of the conveyor 14, and a discharge position indicated in continuous outline in the same Figure in which it is inclined such that its lower end is spaced from the front end of the conveyor 14. The back and forth movement of the web rolling-up device 194 is controlled by the drum 96 of the dispensing unit 92 by means of a transmission system illustrated in detail in FIG. 2. This transmission includes an eccentric cam 202 which is carried by one of the ends of the drum 96 and cooperates with a roller 204 carried by the central part of a lever 206 the lower end 206a of which is articulated about a transverse axis to one of the sides 12. The upper end 206b of the lever 206 is articulated to one end of a longitudinal tie bar 208 the opposite end of which is articulated to the central part of a bell crank lever 210. One arm 210a of the lever 210 is keyed onto one end of a transverse shaft 212 rotatably supported by the plates 172, while the other arm 210b is acted upon by a helical return spring 214. The other end of the transverse shaft 212 is fixed to a lever 216 which is articulated to the upper end of a connecting rod 218 the opposite end of which is articulated to the lower part of the frame 192 of the web rolling-up device 194. In this manner, the rotation of the drum 96 causes angular displacement of the rolling-up device 194 cyclically between its rolling-up position and its discharge position.

The rolling-up unit 170 further includes a driven roller 220 rotatably supported by the side plates 172 adjacent the upper return roller 196 of the rolling-up device 194. The sense of rotation of the drum 220 is indicated by the arrow H in FIG. 3.

Figure 2:
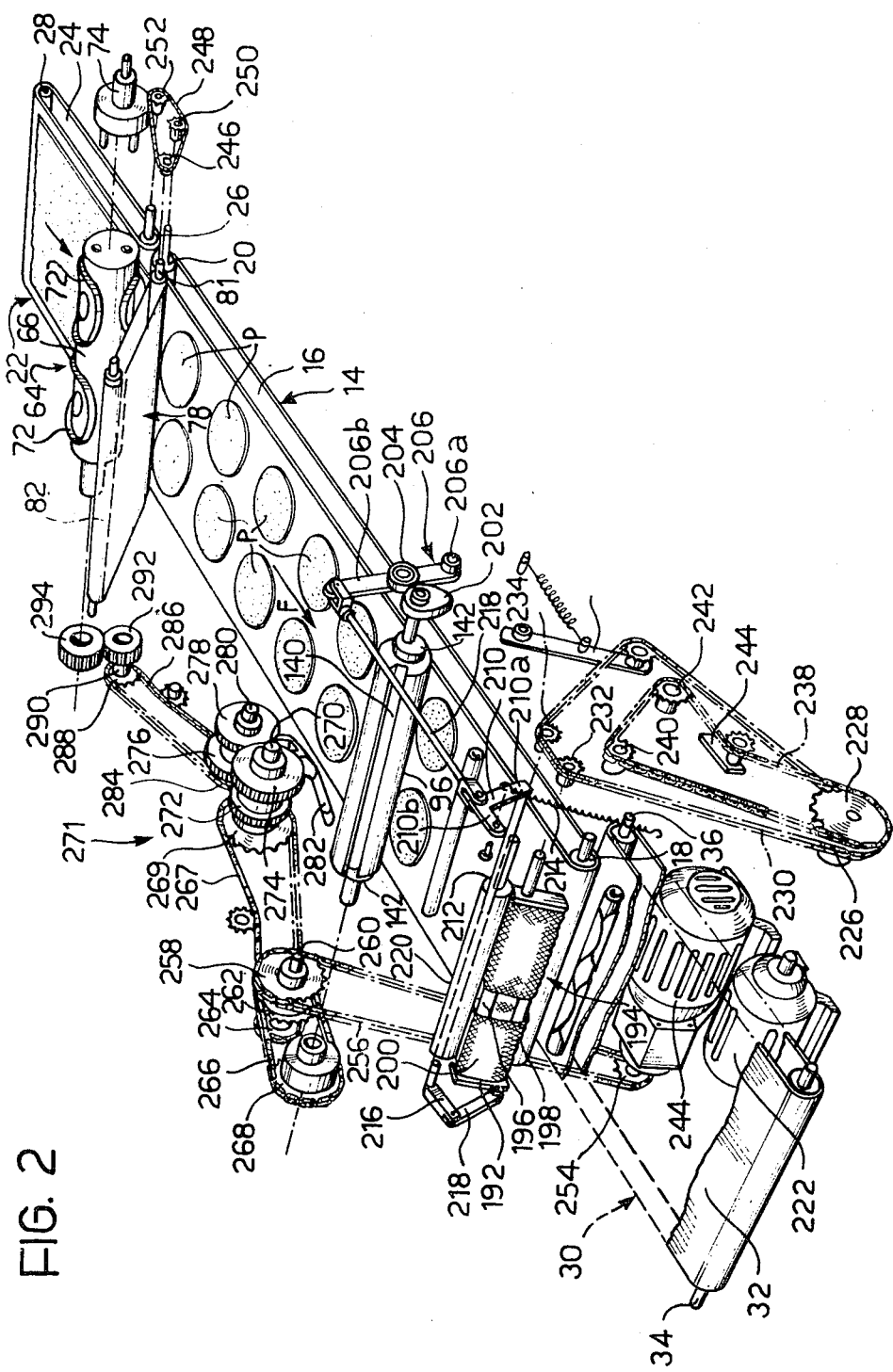
FIG. 2 is a perspective view which shows schematically the moving parts of the machine.
Figure 3:
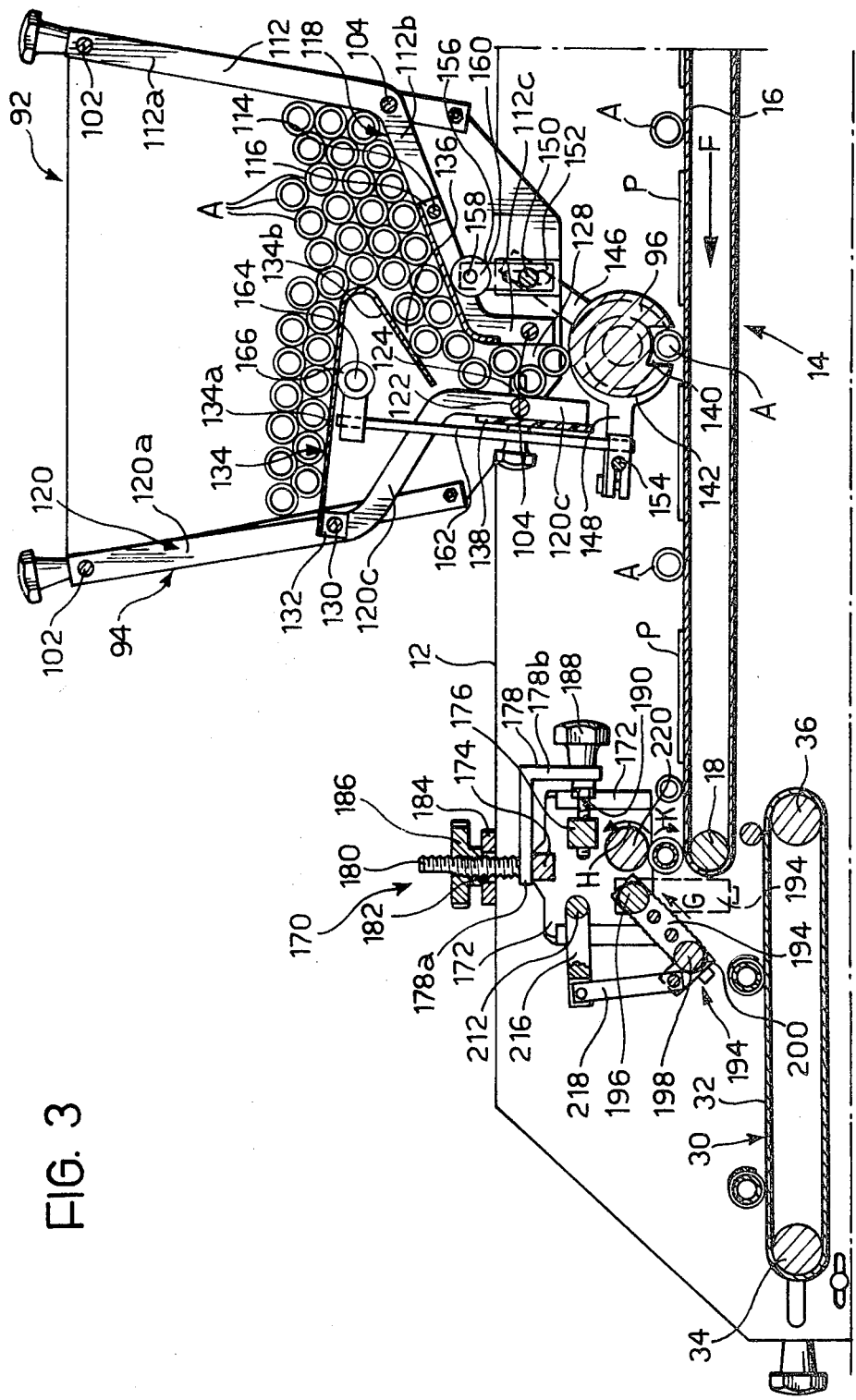
FIG. 3 is a longitudinal sectional view on an enlarged scale of a detail of the machine.
Figure 4:
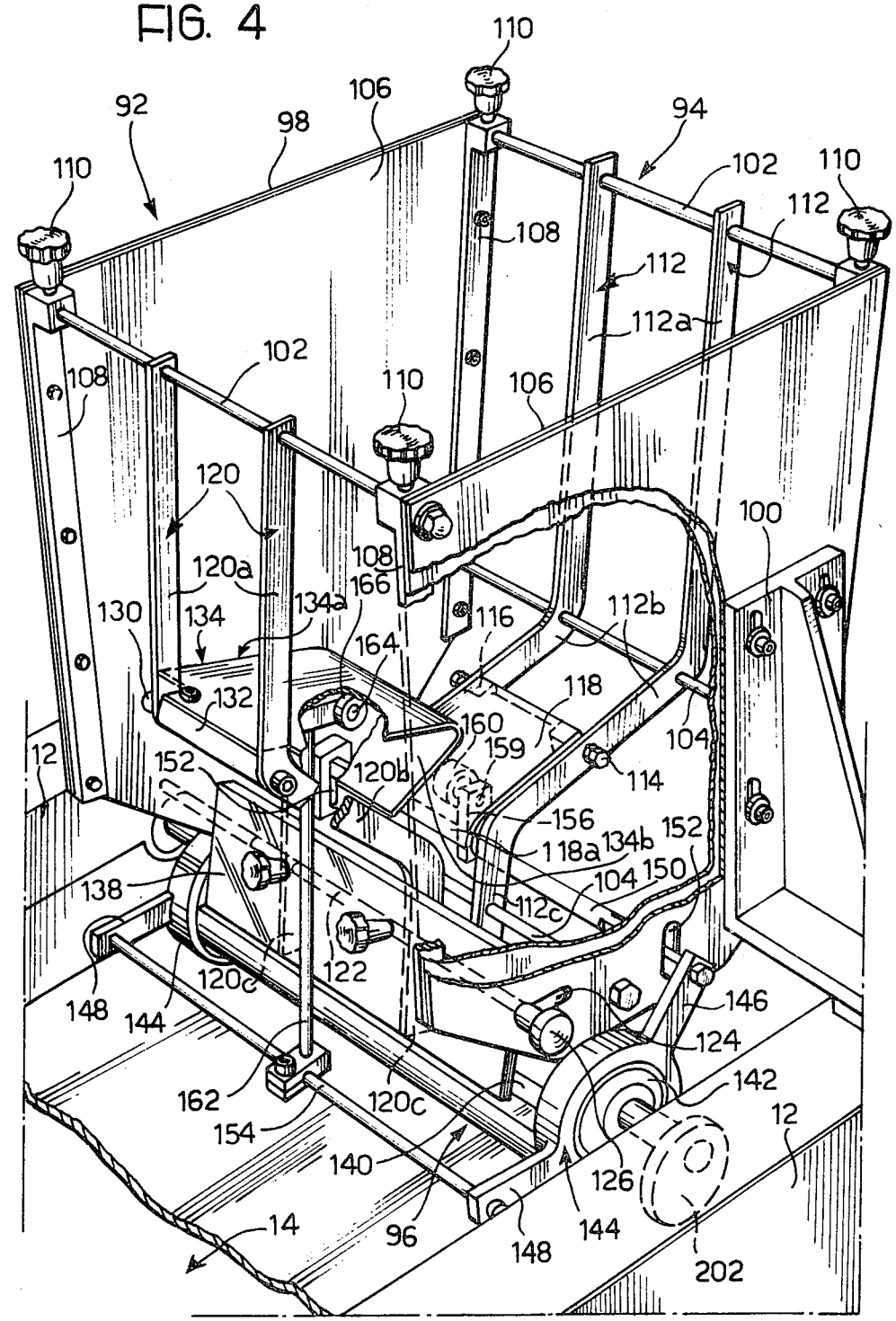
FIG. 4 is a perspective view on an enlarged scale of a further detail of the machine.

In FIG. 2 the drive members and transmission members of the elements of the machine described above are indicated schematically. As is shown in this Figure, the casing of the machine supports, below the collecting conveyor 30, first and second electric motors indicated by 222 and 224 respectively. The shaft of the first motor 222 which is provided in a manner known per se with a stepless speed control, rotatably drives a pair of toothed chain wheels 226, 228 the first of which drives an endless chain 230 which passes around two toothed pinions 232, 234 keyed respectively onto one end of the shaft of the upper return roller 196 of the web rolling-up device 194 and onto one end of the shaft of the roller 220. A tensioning device 236 is also associated with the chain 230.

The second chain wheel 228 drives a chain 238 which passes around two toothed pinions 240, 242 keyed respectively onto the end of the shaft of the front return roller 18 of the conveyor 14 and onto one end of the shaft of the rear return roller 36 of the collecting conveyor 30. A tensioning device 244 is also associated with the chain 238.

On one end of the shaft of the rear return roller 20 of the conveyor 14 is keyed a toothed pinion 246 which drives an endless chain 248 which passes around two toothed pinions 250, 252 keyed respectively onto one end of the shaft of the lower roller 81 of the recovery elevator 78 and on one end of the shaft of the front return roller 26 of the feed conveyor 22.

The shaft of the second electric motor 224, which is provided in a manner known per se with a stepless speed control and with a slip clutch, rotatably drives a toothed pinion 254 which drives an endless chain 256 which passes around a chain wheel 258 keyed onto a return shaft 260. Also keyed onto the shaft 260 are a chain wheel 262 and a chain wheel 264 facing each other. The chain wheel 262 drives an endless chain 266 which passes around a chain wheel 268 keyed onto the end of the shaft of the drum 96 opposite the cam 202. The other chain wheel 264 drives an endless chain 267 which passes around a chain wheel 269 keyed onto the primary shaft 270 of a mechanical gear box 271 with sliding gears. The primary shaft 270 carries two spaced toothed wheels 272, 274 arranged to mesh respectively with a gear wheel 276 and with a gear wheel 278 slidably mounted on a secondary shaft 280. The axial displacement of the two wheels 276, 278 along the shaft 280 is controlled by a manually operable lever 282.

A toothed pinion 284 is also keyed on the secondary shaft 276 and drives an endless chain 286 which passes around a pinion 288 carried by a return shaft 290. On the shaft 290 is keyed a gear wheel 292 which meshes with an identical gear wheel 294 keyed onto the end of the shaft of the punched drum 66. In this manner, the punching drum 66 is rotated in the opposite sense to that of the other rotating members of the machine.

The operation of the machine according to the invention is as follows.

The feed roller 46 on which a sheet of alimentary dough is wound in the form of a roll is positioned in the forked supports 40 in such a manner that the dough sheet rests on the belt 24 of the feed conveyor 22 so as to be able to unwind and be carried towards the rear end of the conveyor 14. The dough sheet is moistened by the action of the moistening rollers 52 and advances beneath the punching drum 64. While the punches 72 of the punching drum 64 successively cut out from the dough sheet a series of spaced-apart pieces P, the part of the dough sheet remaining after the cutting is taken up by the recovery elevator 78 and fed into the receptacle 90 from which it may be taken and recycled. With the particular configuration of the punches 72 illustrated in the drawings, pairs of adjacent pieces P, substantially oval or elliptical in shape, are produced at the output of the punching device 64. These pieces pass beneath the lower end of the elevator 78 and beneath the drum 96 of the dispensing unit 92 and proceed towards the rolling-up unit 170.

Simultaneously the drum 96 serves to remove tubular support cores A individually from the receptacle 94 and deposit them on the working pass of the belt 16 of the conveyor 14 so that each is disposed transversely between two successive pairs of pieces P. The presence of the agitator members described above acting on the walls 118 and 134 of the receptacle 94 ensures a correct and continuous feeding of the support cores A, avoiding the risk of their jamming in the channel 136 and in the zone of the discharge aperture 128. As stated above, the size of the cavity of the receptacle 94 and the width of the discharge aperture 128 may easily be varied in dependence on the dimensions of the support cores A.

The support cores A are then transferred from the conveyor 14 towards the rolling-up unit 170 the operational cycle of which is as follows. Supposing one starts off with the rolling-up device 194 in its discharge position illustrated in continuous lines in FIG. 3, rotation of the drum 96 of the dispensing unit 92 causes, by means of the transmission described previously, the angular displacement of this rolling-up device 194 into its rolling-up position illustrated by broken lines in the same Figure. As a result, a support core A reaching the front end of the conveyor 14 is brought to rest against the web 200 of the rolling-up device 194 and is rotated in the sense indicated by the arrow A due to the movement of this web 200 and of the roller 220. As a consequence, the two pieces of dough P which follow the support core A are by adhesion entrained in rotation thereby such as to roll up thereon, forming a pair of tubular casings. The metal mesh structure of the rolling-up web 200 facilitates the adhesion and the correct rolling up of the dough pieces P on the support core A.

At this point the rotation of the drum 96 causes angular displacement of the rolling-up device 194 into its discharge position, allowing the core A and the two pieces of dough P rolled up therearound to fall under gravity onto the belt 32 of the collecting conveyor 30 which deposits them on the platform 38. The dough pieces P rolled up on the support core A are subsequently transferred to a baking over to stiffen them so that they may be separated from the cores which are subsequently returned into the receptacle 94.

As stated previously, the rolling-up unit 170 may be adjusted horizontally and vertically in dependence on the dimensions of the support cores A just as it is also possible to vary the speed of rotation of the punching drum 66 by means of the gear box 271 depending on the desired distance between the pieces of dough along the conveyor 14.

The casings of dough produced by the machine according to the invention are intended to be filled with edible cream to make the so-called "Sicilian Cannoli". Naturally the machine may also be used for producing dough casings of various types, for example casings formed from a helically wound strip usable for the so-called "cannoncini" confection, by varying the configuration of the punching drum 64.

Naturally, the principle of the invention remaining the same, the details of construction and the embodiments may be varied widely with respect to that described and illustrated without thereby departing from the scope of the present invention. Thus, for example, the moistening unit of the machine may be formed in a manner different from that illustrated and equivalent devices from the functional point of view, such as brushes or the like, may be used to moisten the dough upstream of the punching device.

I claim:

1. A machine for the production of tubular casings of alimentary dough by rolling up pieces of sheet dough around a cylindrical support core, said machine comprising:

a support structure;

a continuous belt conveyor mounted on the support structure and having a receiving end and a discharge end, feed means for feeding a continuous sheet of dough to the receiving end of said conveyor;

a punching device disposed above said conveyor downstream of the feed means and provided with shaped punches arranged to cut said continuous sheet of dough in synchronism with the advance of said conveyor so as to cut out successively from the said continuous sheet a series of spaced-apart pieces or groups of adjacent pieces of dough, recovery means disposed along said conveyor downstream of said punching device and arranged to take up from the conveyor that part of the dough sheet remaining after the cutting of the said pieces;

a dispensing unit arranged above said conveyor downstream of the said recovery means and comprising a receptacle for containing cylindrical support cores, and a withdrawal member for taking out support cores from the receptacle and depositing them on said conveyor such that each said core is disposed transversely between two successive said pieces or groups of pieces of dough, a rolling-up unit disposed transversely adjacent the discharge end of said conveyor and comprising an endless web extending upwardly with respect to the conveyor, the said endless web being supported adjacent its upper end from said support structure for back and forth movement and having a rolling-up pass which, in use, has a direction of advance from its lower end towards its upper end away from said conveyor, and actuator means for effecting in synchronism with the operation of said withdrawal member of the dispensing unit, back and forth movement of the said endless web between a substantially-vertical rolling-up position and an inclined discharge position, said endless web being operative when in its rolling-up position to entrain in rotation a said support core fed thereto by said conveyor and to cause the rolling-up thereon of a respective piece or group of pieces of dough, and collecting means for receiving the said support cores with respective pieces or groups of pieces of dough rolled up thereon from the discharge end of said conveyor when the said endless web of the rolling-up unit is moved into its discharge position.

2. A machine according to claim 1, wherein said endless web of the rolling-up unit is constituted by a metal mesh.

3. A machine according to claim 1, wherein the said actuator means of the rolling-up unit comprise cam means driven from the said withdrawal member of the dispensing unit, and transmission means cooperating with the said cam means for effecting back and forth movement of said endless web.

4. A machine according to claim 1, wherein the said feed means comprise a continuous-belt feed conveyor unit aligned with the said conveyor and having a speed of advancement corresponding to that of the said conveyor, a pair of fork-shaped supports facing each other and fixed to the said support structure of the machine laterally of the said feed conveyor unit, and a roller supported for free rotation and vertical sliding movement by the said support forks and upon which a sheet of alimentary dough is intended to be wound in the form of a roll.

5. A machine according to claim 1, wherein the punching device is constituted by a rotary drum having the said shaped punches on its lateral surface.

6. A machine according to claim 1, wherein the said recovery means include an endless belt elevator extending upwardly from said conveyor and having a speed of advancement corresponding to that of the conveyor, and a collecting receptacle fed by the said elevator.

7. A machine according to claim 1, wherein said collecting means comprise a continuous-belt conveyor unit arranged below the discharge end of said conveyor, and a receiving platform fed by the said collecting conveyor unit.

8. A machine according to claim 1, wherein:

said rolling-up unit further includes a driven roller disposed above and transversely of the discharge end of said conveyor close to said endless web, said recovery means include an endless belt elevator extending upwardly from the conveyor and having a speed of advance corresponding to that of the conveyor, said feed means include a continuous-belt feed conveyor unit aligned with said conveyor and having a speed of advance corresponding to that of said conveyor, and said collecting means comprise a continuous-belt conveyor unit arranged below the discharge end of said conveyor; said machine having a motor with associated transmission means, including gear wheels and an endless chain, for simultaneously driving said conveyor, the said endless web and the said roller of the rolling-up unit, the said recovery elevator, the said feed conveyor unit and the said collecting conveyor unit.

9. A machine according to claim 1, further comprising a dough moistening unit carried by said support structure immediately upstream of said punching device.

10. A machine according to claim 1 or claim 2, wherein said rolling-up unit further includes a driven roller disposed above and transversely of the discharge end of said conveyor close to said endless web.

11. A machine according to claim 10, wherein said rolling-up unit further includes a support frame which carries the said endless web and the said driven roller and is connected in an adjustable manner to the said support structure of the machine.

12. A machine according to claim 1, wherein the receptacle of the dispensing unit is in the form of a hopper fixed to the said support structure of the machine and defining at its lower end an elongate aperture of adjustable width disposed transversely to said conveyor, the said withdrawal member of the dispensing unit being constituted by a rotary drum which is interposed between the said aperture of the hopper and said conveyor and which is formed with at least one longitudinal groove in its external surface, said groove having a form and dimensions such as to house one of the said support cores.

13. A machine according to claim 12, wherein the said actuator means of the rolling-up unit comprises an eccentric carried by one end of the said rotary drum of the dispensing unit, and transmission means cooperating with the said eccentric for effecting back and forth movement of said endless web.

14. A machine according to claim 12, wherein the said hopper of the dispensing unit has a size which is adjustable in dependence on the dimensions of the said support cores intended to be disposed therein.

15. A machine according to claim 12, wherein said dispensing unit further includes an agitator device driven by the said rotary drum and acting on the bottom of said hopper.

16. A machine according to claim 15, wherein the bottom of said hopper includes two movable walls, said agitator device comprising a pair of cams carried by the ends of said rotary drum, two annular supports surrounding the said cams and cooperating therewith, and a pair of agitator members connected to the said annular supports and acting against the said movable walls of the hopper.

17. A machine according to claim 12, wherein said punching device is constituted by a rotary drum having the said shaped punches on its lateral surface, said machine including a motor and associated transmission means, including gear wheels and an endless chain, for simultaneously driving the said rotary drum of the dispensing unit and the said punching drum.

18. A machine according to claim 17, wherein the said transmission means associated with said motor include a manually-controlled gear box controlling the speed of rotation of said punching drum.

* * * * *